H. G. IRWIN.
PUSH BAR ATTACHMENT FOR TRACTORS.
APPLICATION FILED AUG. 5, 1921.
1,420,106.
Patented June 20, 1922.
3 SHEETS—SHEET 1.
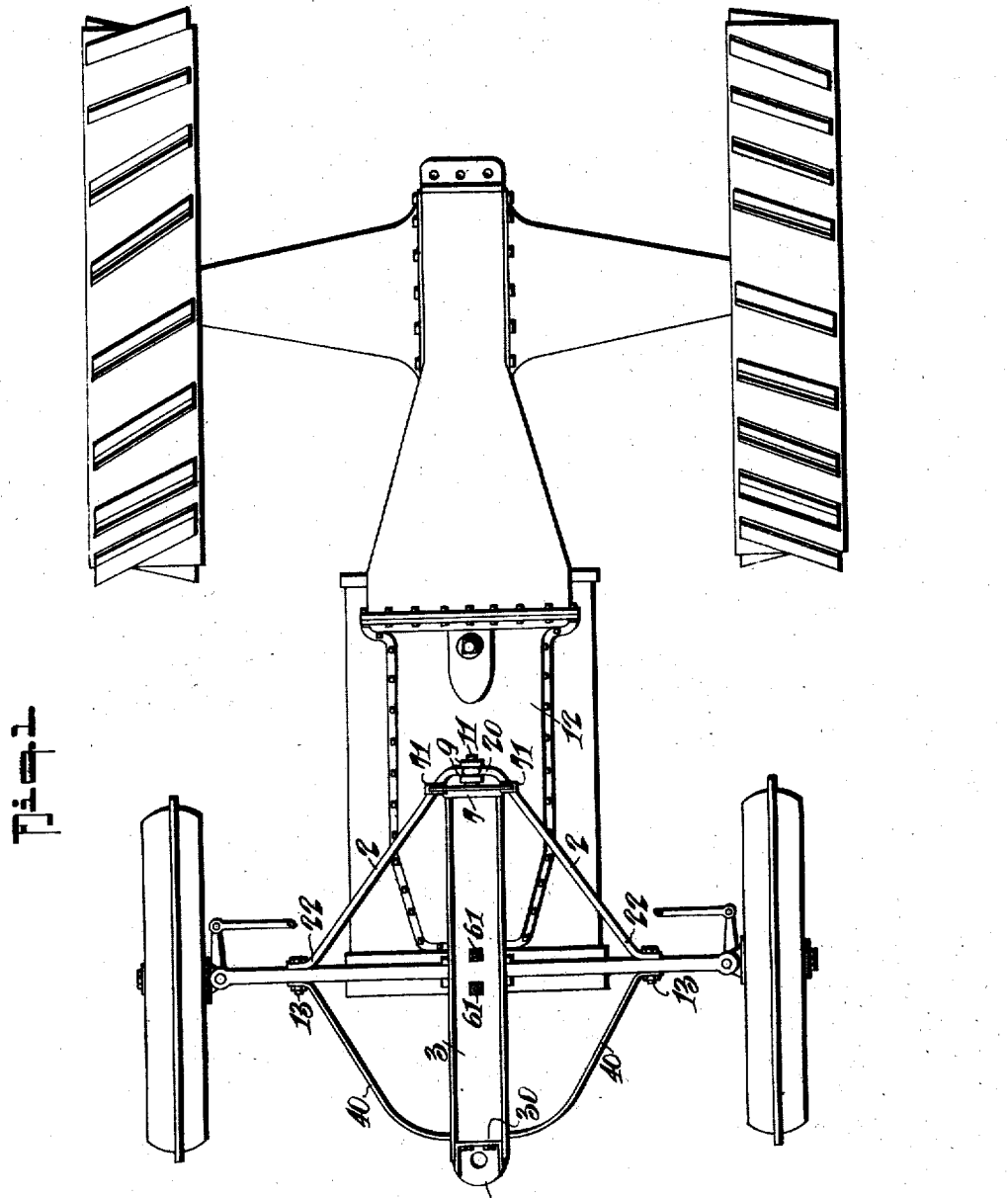
INVENTOR
Herbert G. Irwin
BY
Fred G. Dieterich & Co
ATTORNEYS H. G. IRWIN.
PUSH BAR ATTACHMENT FOR TRACTORS.
APPLICATION FILED AUG. 5, 1921.
1,420,106. Patented June 20, 1922.
3 SHEETS—SHEET 2.
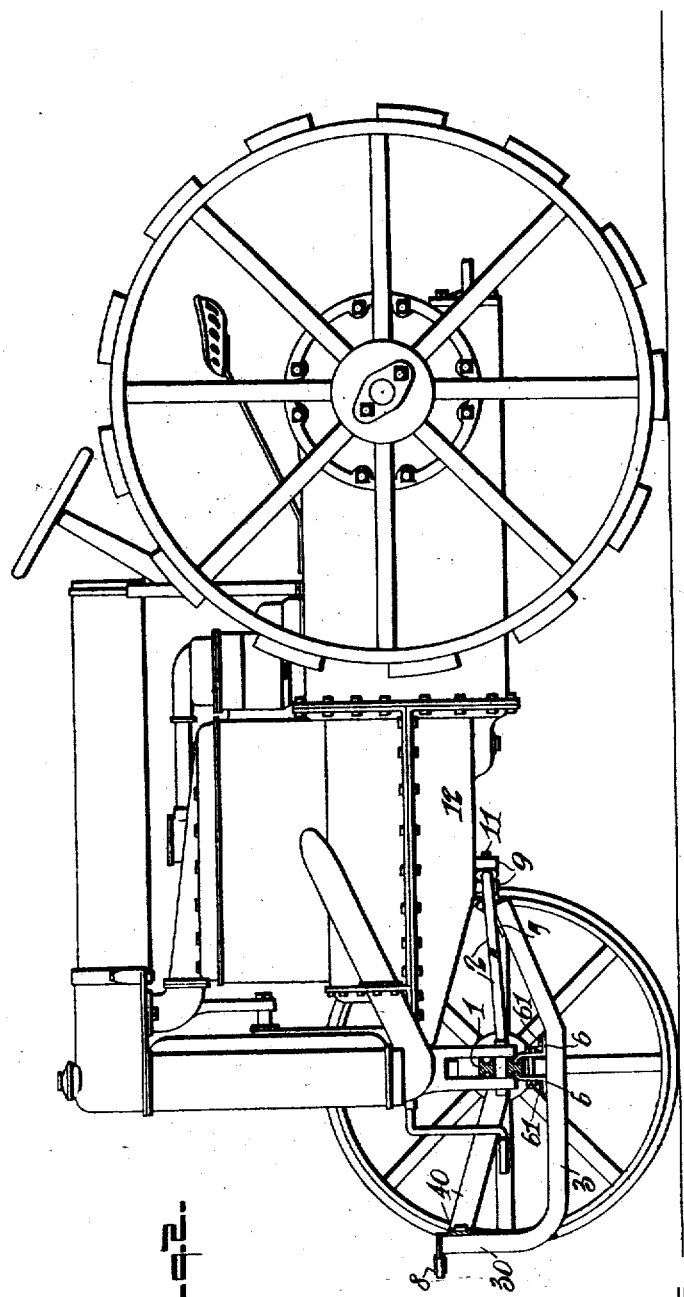
INVENTOR
*Herbert G. Irwin.*
BY
ATTORNEYS

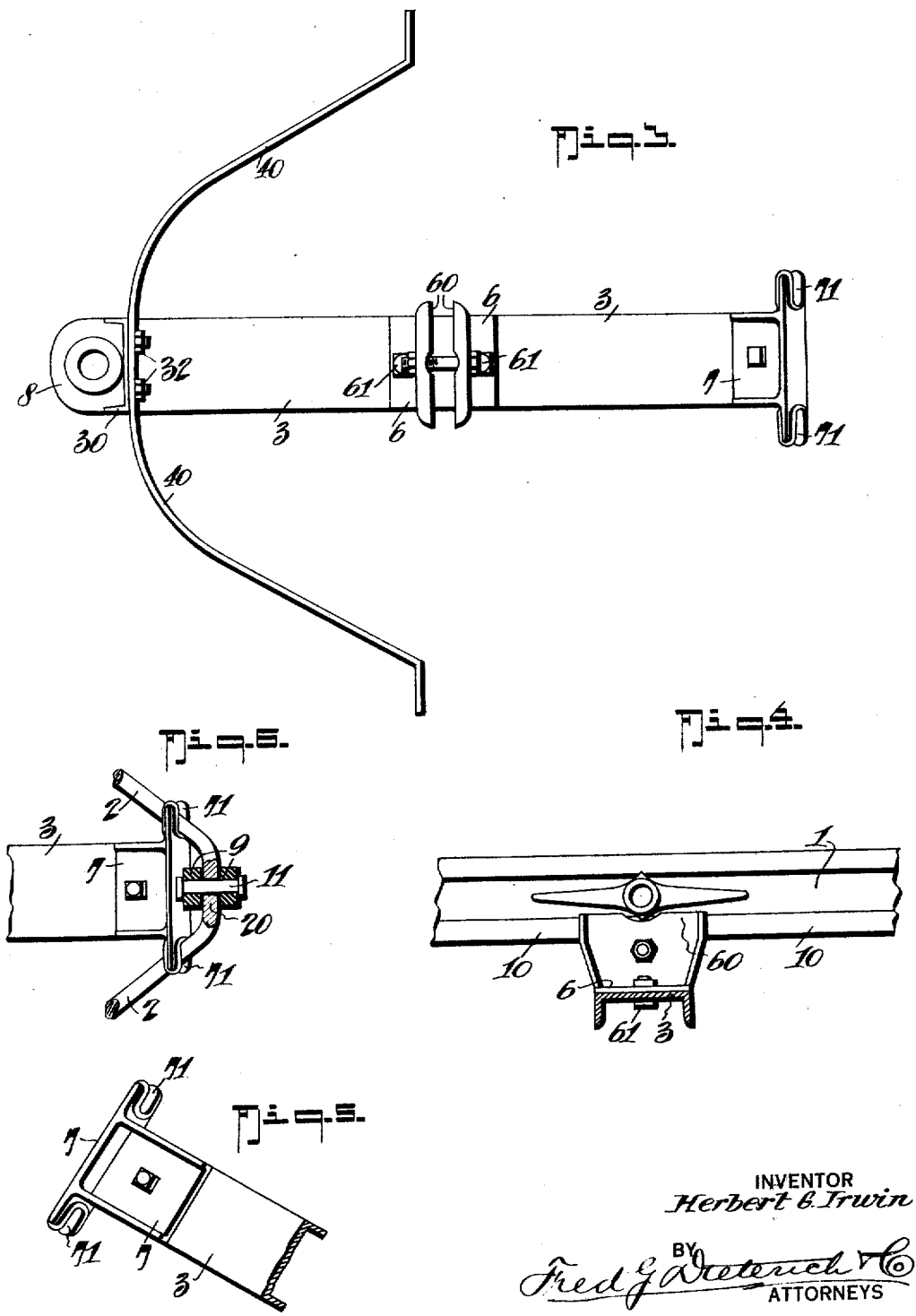

UNITED STATES PATENT OFFICE.

HERBERT G. IRWIN, OF AMARILLO, TEXAS.

PUSH-BAR ATTACHMENT FOR TRACTORS.

1,420,106. Specification of Letters Patent. Patented June 20, 1922.

Application filed August 5, 1921. Serial No. 490,122.

*To all whom it may concern:*

Be it known that I, HERBERT G. IRWIN, a citizen of the United States, residing at Amarillo, in the county of Potter and State of Texas, have invented a new and useful Push-Bar Attachment for Tractors, of which the following is a specification.

This invention relates to means attachable to a tractor and it has particular reference to that type of draft rigging for tractors more especially designed to adapt the tractor for engagement with farm machinery and whereby the said tractor may push such machinery along the field or over roads.

Primarily, my invention has for its purpose to provide a push bar attachment for tractors of a relatively simple and inexpensive construction, which is readily secured to and removed from the tractor and which does not interfere with any of the usual movements of the tractor, in which the parts are strong and durable and adapted for being assembled in a compact manner, whereby when operatively applied the tractor may readily push the machinery ahead over rough as well as level ground.

With other objects in view, that will become apparent as the detailed description of my invention progresses, my said invention embodies a tractor hitch in the nature of a push bar attachment which comprises the peculiar features of construction and novel combination of parts hereinafter clearly stated in the following explanation, specifically pointed out in the appended claims and illustrated in the accompanying drawings, in which:—

Figure 1 is an inverted plan view of my push bar attachment, so much of a tractor structure being indicated as is necessary to illustrate the practical application of my invention.

Figure 2 is a side view of a tractor with one front wheel removed and the front axle thereof in section, and it illustrates the method of operatively connecting the push bar attachment to the tractor body and its front axle.

Figure 3 is a top plan view of the push bar attachment.

Figure 4 is a detail cross section thereof taken substantially on the line 4—4 of Figure 2.

Figure 5 is a detail perspective view of the rear end of the push bar and its attached saddle piece.

Figure 6 is a somewhat enlarged plan view, parts being in horizontal section, of the rear end of the push bar and the operative connections that couple the bar with the draft lugs on the tractor body and the front axle brace members, hereinafter specifically referred to.

The showing of a tractor body in the drawing is intended for illustrative purposes only, as it is to be understood that in the practical application of my construction of push bar the same may be readily secured to any of the conventional makes of tractors, since the parts of my attachment are so designed that they may easily be cooperatively assembled and attached to a tractor body and the front axle thereof by any one familiar with the attaching of draft rigging or hitches to tractors.

Referring to the details of construction, 3 designates the main or push bar of the attachment which, for strength, is preferably channeled, as shown. The main bar 3, when the attachment is secured to the tractor, as is best shown in Figure 2, has its straight or horizontal portion suspended from the front axle 1 of the tractor at the center thereof, as is best shown in Figure 1, it being secured to the axle by a pair of oppositely disposed jaws 60—60 of clamping brackets 6—6 which are firmly attached to the bar 3 by the bolts 61—61. The jaws 60—60 are claw shaped for engaging the opposite side flanges 10—10 of the axle, as is clearly shown in Figure 2.

The rear end of the bar is angled upwardly slightly and to the extreme rear end thereof is rigidly secured a transversely disposed saddle piece 7 whose opposite ends terminate in right angled U shaped projections 71—71, the purpose of which will presently appear.

2 designates what is termed the front axle brace and the same comprises a stout rod substantially V shape and whose rear or apex portion includes a straight across member 20, which is adapted for fitting between a pair of draft lugs 9—9 pendant from the bottom of the crank case 12 of the tractor and which is rockably secured between the said lugs by a cross pin 11 that passes through the lugs and an aperture in the cross member 20, as is clearly indicated in Figures 1 and 6, by reference to which it will also be seen the rear end of the push bar 3 is adjacent the forward lug 9 and its saddle piece 7 is so disposed that its opposite U shaped ends embrace the adjacent side members of the axle brace 2, providing, as it were, a simple and effective connection for coupling the rear end of the bar with the axle brace 2. The forwardly extending portion of the push bar 3 terminates in a right angle vertically extending member 30 whose upper end is located in a plane some distance above the front axle and sufficiently forward of the tractor crank to avoid interference therewith, and the said upper end is provided with a bracket 8 which is adapted to fit in the channel of the said bar and is rigidly secured in place by the bolts 32, as shown, thereby to provide a means for coupling the farm machinery to be pushed.

To add rigidity and strength to the push bar 3, the front end portion of the said bar 3, which extends beyond the front of the tractor body and the tractor tank, is braced by a thrust bow member 40, which is disposed transversely of the said push bar and the center of which is rigidly secured to the upper end of the vertically extended front portion 30 of the push bar. The opposite portions of the bow member 40 extend downwardly and inwardly and have their ends secured adjacent the front face of the front axle 1 and secured to the said axle by brace bolts 13 which pass through the axle and which are also utilized for attaching the outer ends 22 of the axle brace 2, as shown.

From the foregoing description taken in connection with the drawings, the construction and operation of my improved attachment will be readily understood by those skilled in the art to which this invention relates.

Among other advantages it should be noted my construction of push bar attachment is such that the point of connection with the tractor is at the forward part of the tractor body adjacent the front axle with the bar extended under and attached directly to the axle. Further the bar is connected to such axle through the axle brace 2, its outer or front end being rigidly joined with the front axle by the brace 40, the several operative connections for joining the attachment to the tractor body and the front axle thereof being such that they may be conveniently taken apart when it is desired to remove the attachment from the tractor body for repairs or for other reasons.

What I claim is:

1. An attachment for tractors comprising a centrally disposed push bar having an upright end portion mounted forward of the tractor body below the center of revolution of the starting crank thereof and parallel thereto, the said bar including a horizontal midway portion disposed directly under the said starting crank and with spaced relation to and underneath the front axle at the center thereof, the said bar also including an upwardly inclined rear end portion that projects under the tractor body and the front axle brace and which is secured, at its extremity, to the said front axle brace.

2. In a draft rigging for tractors the combination with the front axle and its brace; of a pusher means comprising a single bar that is centrally disposed with respect to the bottom of the tractor and the front axle and which includes a midway straight portion pendently spaced from the axle, means for hanging the bar in rigid condition from the axle, the said midway straight portion extending beyond the tractor crank and out of the zone of turning of said crank and terminating in an up-turned portion adapted to be coupled to the machine to be pushed, the rear end of the aforesaid bar terminating in an upwardly inclined portion, and means for securing the extremity of the said rear portion to the axle brace.

3. In an attachment of the character described for tractors, the combination with the tractor front axle and its axle brace; of a single bar including a midway straight portion, an integral front upright vertical portion having provision for connecting with the machine to be pushed and an upwardly inclined rear portion, means for suspending the midway portion of the bar rigid and spaced some distance below the axle, the said means comprising oppositely disposed brackets rigidly secured to the bar and having portions that clamp the lower flange members of the axle at its longitudinal center and means mounted on the upwardly inclined rear end of the bar for securing the said end of the bar to the rear extremity of the front axle brace.

4. A push bar attachment for tractors comprising a main bar, clamping devices mounted transversely of and attached to the said main bar, the said devices being adapted for extending lengthwise of and clamping the opposite faces of the front axle, said bar including a vertical right angled portion having provision for connecting with the machine to be pushed, operative connections joining with the axle and the tractor body for bracing the rear end of the bar, and a supplemental brace device connecting the front axle and the upper end of the front vertical portion of the said bar.

5. In a draft rigging for tractors, the combination with the front axle of the tractor, a draft lug pendent from the tractor body and located to the rear of the front axle, and a brace device having a portion that is rockably connected to the draft lug and whose forward end is fixedly attached to the front axle; of a push bar comprising a midway portion, means for rigidly sustaining the said midway portion from the front axle, the forward end of the bar having provision for connecting with a machine to be pushed, a thrust bow member disposed transversely of said bar, the center of which is rigidly secured to the said forward end thereof and whose spread ends are secured adjacent the front face of the front axle, and operative connections joining the rear end of the bar with the brace device.

6. In a draft rigging for tractors, the combination with the front axle of the tractor, a draft lug pendent from the tractor body and located to the rear of the front axle, and a brace device having a portion that is rockably connected to the draft lug and whose forward end is fixedly attached to the front axle; of a push bar comprising a midway portion, means for rigidly sustaining the said midway portion from the front axle, the forward end of the bar having provision for connecting with the machine to be pushed, operative connections joining the rear end of the bar with the brace device attached to the front axle and to the draft lug, said connections including a saddle member fixedly attached to the rear end of the bar whose ends are shaped to engage the front axle brace device.

7. In a tractor attachment of the character described, the combination with the tractor axle and a draft lug pendent from the tractor body and located to the rear of the front axle and a V shaped brace device whose spread ends are adapted for being secured to the axle and whose other end is adapted for being rockably connected to the pendent draft lug of the tractor; of a bar having means midway its length for attaching it to the underside of the front axle, the forward end of the bar having provision for connecting with the machine to be pushed, and means for attaching the rear end of the bar to the front axle brace, the said means including a saddle member secured on the rear end of the bar transversely thereof and whose opposite ends are U shaped and adapted for embracing their respective adjacent sides of the V shaped brace member.

8. A push bar attachment for tractors comprising a slanting thrust bow member disposed forward of the tractor body and having its spread ends secured adjacent the front face of the front axle, a centrally disposed bar provided with an upturned front end portion having provision for coupling with a machine to be pushed and adapted for supporting the forward end of said bow member and rigidly secured thereto, the said bar having a horizontal midway portion passing under the front axle and rigidly secured with spaced relation thereto, and an upwardly inclined rear end portion provided with a bracket for engaging the front axle brace.

9. The combination with the front axle and the front axle brace; of a push bar secured to and passing under the front axle and having its rear end directly engaging the brace and its forward end upturned, a thrust bow member interposed between the said upturned end and the front axle and securely attached to the said axle and the said upturned end.

10. The combination with the front axle and the front axle brace, of a push bar secured to and passing under the front axle, a saddle rigidly attached to the rear end of the push bar, said saddle having opposite portions for freely engaging their adjacent opposite members of the front axle brace.

HERBERT G. IRWIN.